United States Patent [19]

Brown

[11] Patent Number: 4,925,433
[45] Date of Patent: May 15, 1990

[54] POWER TRANSMITTING SYSTEM

[76] Inventor: Lawrence G. Brown, 1629 Kuhilani St., Honolulu, Hi. 96816

[21] Appl. No.: 172,364

[22] Filed: Mar. 24, 1988

Related U.S. Application Data

[63] Continuation of Ser. No. 372,142, Apr. 27, 1982, abandoned.

[51] Int. Cl.⁵ ............................................. F16H 55/56
[52] U.S. Cl. .................................... 474/9; 474/49; 474/100; 474/245
[58] Field of Search ................. 474/47, 49–57, 474/100, 240, 242, 244, 245, 243, 9

[56] References Cited

U.S. PATENT DOCUMENTS

| | | | |
|---|---|---|---|
| 803,811 | 11/1905 | Cutter | 474/245 X |
| 997,480 | 7/1911 | Twombly | 74/50 X |
| 1,691,871 | 11/1928 | Reeves | 474/245 |
| 2,550,431 | 4/1951 | Shaw | 474/242 X |
| 3,045,773 | 7/1962 | Sampietro | 474/100 X |
| 3,279,271 | 10/1966 | Sackl | 474/56 |
| 4,030,373 | 6/1977 | Leonard | 474/53 |
| 4,259,874 | 4/1981 | Guirriec | 474/56 X |
| 4,367,067 | 1/1983 | Chao | 474/243 X |
| 4,409,862 | 10/1983 | Adkins | 474/53 X |
| 4,705,492 | 11/1987 | Hattori et al. | 474/49 |

FOREIGN PATENT DOCUMENTS

| | | | |
|---|---|---|---|
| 30992 | 7/1971 | European Pat. Off. | 474/49 |
| 2713589 | 10/1978 | Fed. Rep. of Germany | 474/243 |
| 696296 | 12/1930 | France | 474/53 |
| 77363 | 9/1931 | Sweden | 474/245 |
| 878075 | 9/1961 | United Kingdom | 474/100 |
| 989894 | 4/1965 | United Kingdom | 474/49 |

Primary Examiner—Dwight G. Diehl
Attorney, Agent, or Firm—Klaas & Law

[57] ABSTRACT

A power transmitting system for transmitting power between a power source, such as an internal combustion engine or an electric motor or the like, and a driven device, such as a vehicle wheel or the like, comprising an endless power transmitting device, such as a chain or a belt, and a plurality of pulley devices including at least one variable diameter pulley with clamping devices associated with the variable diameter pulley and the endless power transmitting device to clamp them together during movement of the endless power transmitting device around the variable diameter pulley.

20 Claims, 11 Drawing Sheets

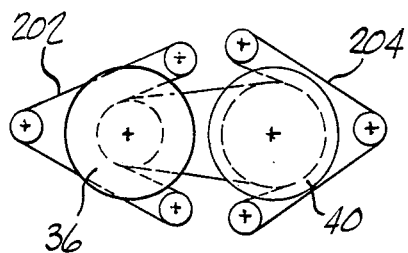
FIG. 13
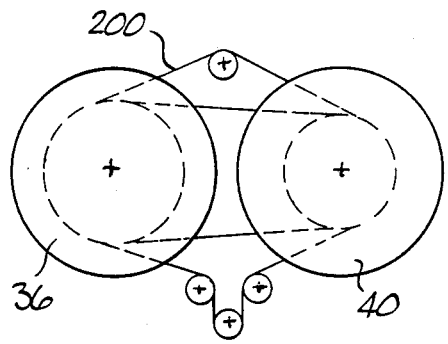
FIG. 12
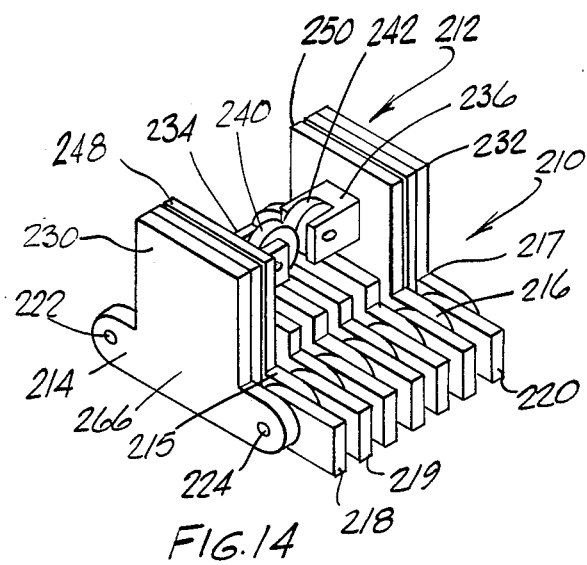
FIG. 14
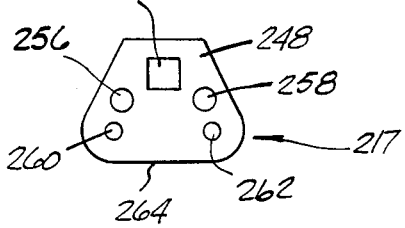
FIG. 15
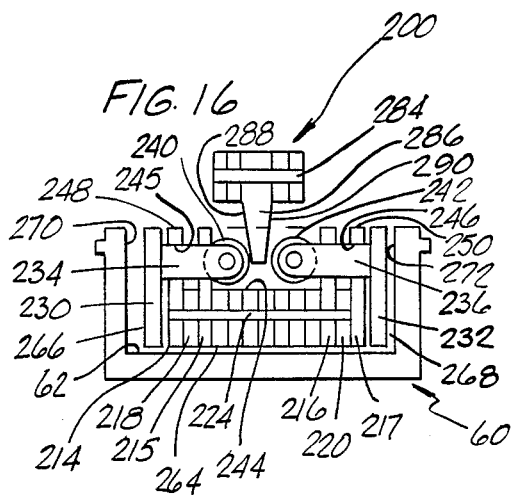
FIG. 16
FIG. 17

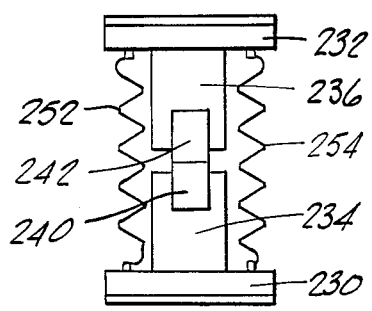
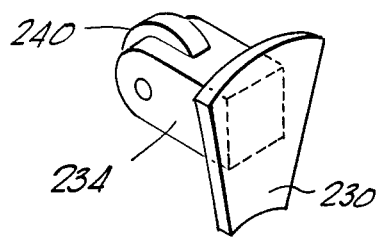

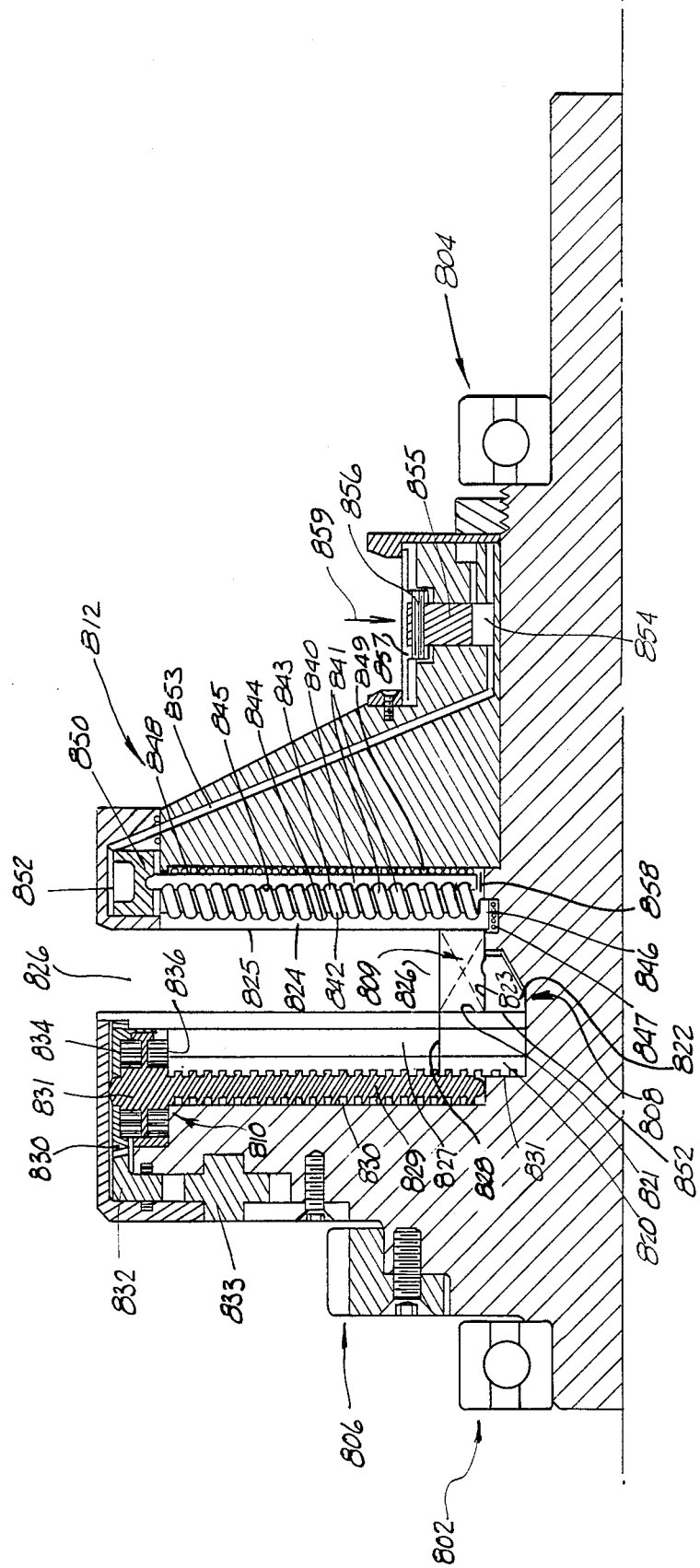

1

POWER TRANSMITTING SYSTEM

This application is a continuation of application Ser. No. 372,142, filed Apr. 27, 1982.

BACKGROUND AND SUMMARY OF INVENTION

This invention relates to power transmitting systems and, more particularly, to a power transmitting system which utilizes at least one endless power transmitting device such as a chain or belt with at least one variable diameter pulley whereby input-output velocity ratios may be varied in accordance with differences in pulley diameter ratios.

A primary objective of the present invention is to provide a variable ratio power transmitting system of relatively high efficiency (e.g., on the order of approximately 90 % or more) by use of essentially incompressible mechanisms which enable a substantial area of a flat surface of an essentially non-stretchable endless power transmitting device to be essentially non-slidably clamped to a substantial area of a flat surface of an essentially rigid variable diameter pulley device.

Another object is to provide clamping mechanism which is operable by relatively low operating forces under relatively low load conditions and which varies the operating force in proportion to load variations.

Another object is to enable continuous substantially infinite variation of input and output ratios within predetermined ranges.

Another object is to provide for continuous ratio changes without significant efficiency loss by changing ratios when the endless power transmitting device is disengaged from the pulley device.

Another object is to enable usage of the system under a wide range of loads without damage to the components of the system.

The foregoing and other objects and advantages of the present invention are obtained by use of clamping devices employing relatively large area surface contact rather than line or point contact between relatively movable components of the system. In addition, the inventive concepts may be employed in a manner to eliminate axial thrust loads on the pulley device.

BRIEF DESCRIPTION OF DRAWING

Illustrative and presently preferred embodiments of the invention are illustrated in the accompanying drawing wherein:

FIGS. 12 and 13 are schematic views of apparatus utilizing a clamping belt in association with apparatus of the type shown in FIGS. 1-11;

FIG. 14 is a schematic perspective view of one form of chain locking apparatus operable by one form of actuating apparatus;

FIG. 15 is a schematic perspective view of a portion of an actuating apparatus operable with the chain locking apparatus of FIG. 14;

FIG. 16 is a schematic side elevational view of the chain locking apparatus and actuating apparatus of FIGS. 14 and 15;

FIG. 17 is a schematic side elevational view of a chain link member of the apparatus of FIGS. 14-16;

FIG. 18 is a schematic perspective view of a clamping block of the apparatus of FIGS. 14-16;

FIG. 19 is a schematic top view of the clamping blocks of the apparatus of FIGS. 14-16;

FIG. 20 is a schematic side view of another embodiment of a clamping block and actuating mechanism;

FIG. 26 is a cross-sectional view of another embodiment of the invention.

DETAILED DESCRIPTION OF INVENTION

Figure 1:
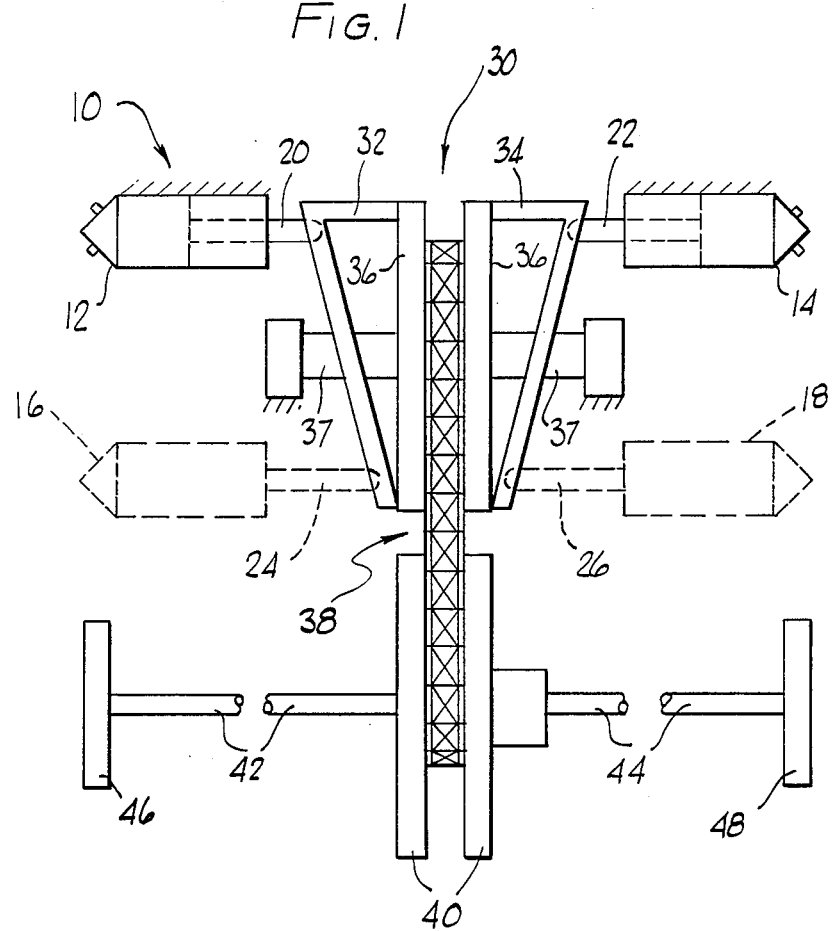
FIG. 1 is a schematic view of the apparatus of the present invention in operative association with and between driving apparatus such as an internal combustion engine and driven apparatus such as the wheels of a vehicle.

FIG. 1 illustrates an internal combustion engine means 10 comprising a plurality of cylinders 12, 14, 16, 18 with reciprocating piston rod means 20, 22, 24, 26 directly operably connected to a transmission means 30 comprising swash plate means 32, 34 operably connected to the piston means and mounted on opposite sides of a pulley means 36 connected by an endless drive means 38 to a pulley means 40 operably connected to output shaft means 42, 44 for driving vehicle wheels 46, 48. It is to be understood that the term "pulley means" as used herein is intended to include any kind of a rotary transmission element such as a sprocket or pulley device.

The pulley means 36, 40 are of a variable diameter type enabling the "gear ratio" of the transmission means to be selectively infinitely varied within a preselected range of "gear ratios". In addition, the transmission means is constructed and arranged to provide positive non-slip clamping driving engagement between the endless drive means 38 and the pulleys 36, 40 as hereinafter described.

Figure 2:
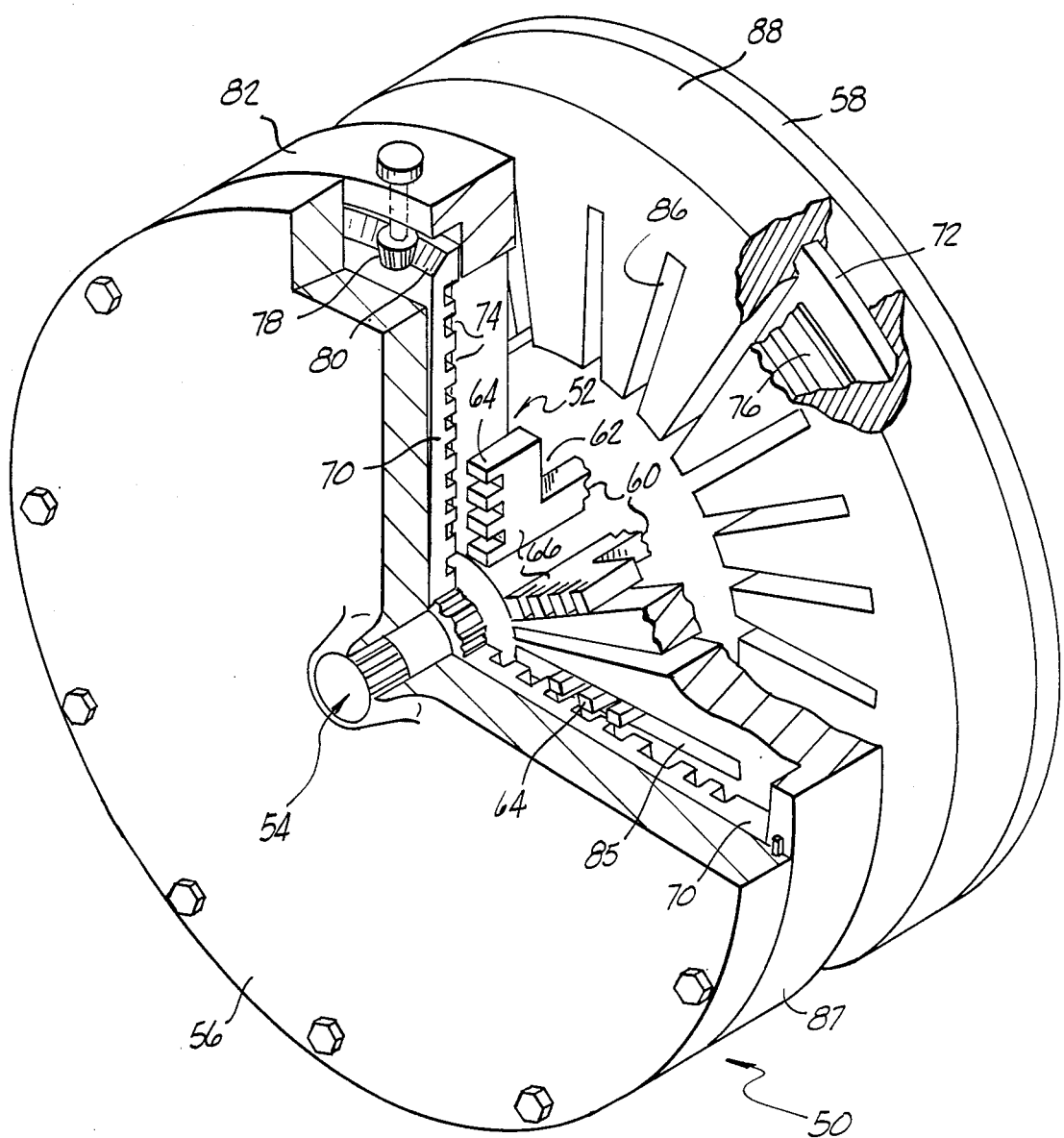
FIG. 2 is an enlarged schematic perspective view of a pully device embodying concepts of the present invention.
Figure 3:
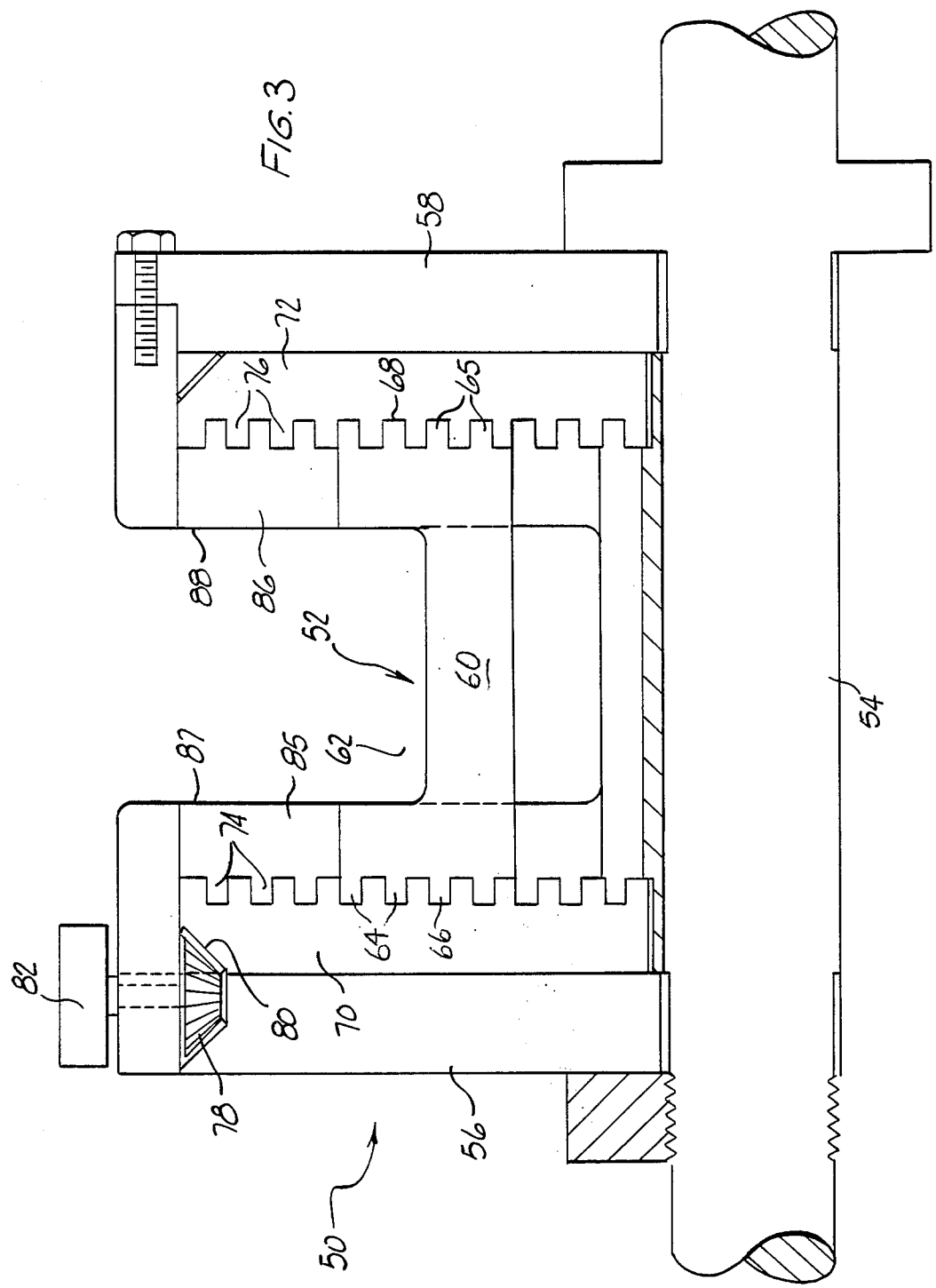
FIG. 3 is an enlarged cross-sectional schematic view of a pulley device of the type shown in FIG. 2.
Figure 4:
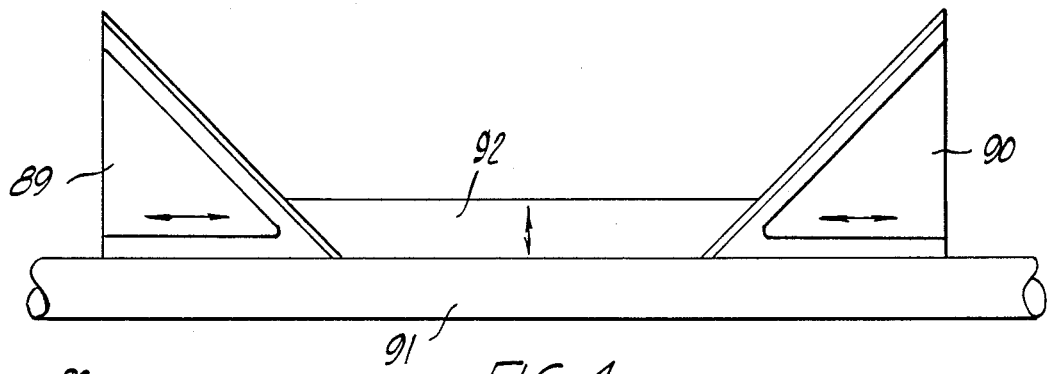
FIG. 4 is a schematic side elevational view of a modification of the apparatus of FIGS. 2 and 3.
Figure 5:
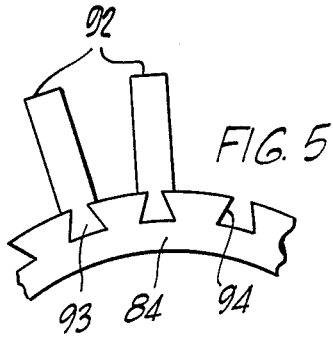
FIG. 5 is an end view of the apparatus of FIG. 4.

Referring now to FIGS. 2 and 3, an illustrative form of pulley means 36, 40 is shown to comprise a pulley means 50 having continuously variable diameter changing means 52 mounted on a shaft means 54 between side plates 56, 58. The means 52 comprises a plurality of circumferentially spaced radially extending radially adjustable U-shape support members 60 having a central trough 62 with adjustment lug members 64, 65 located along the lateral side surfaces 66, 68 thereof. Members 60 are adjustably connected to rotatable scroll plate members 70, 72 which have spiral grooves 74, 76 to receive lug members 64, 65. Adjustment control means, in the form of a bevel gear 78 operably associated with bevel gear teeth 80 on the periphery of scroll member 70 and operable by a hand wheel 82 or other suitable control apparatus such as an electric motor or cable, are provided to enable the radial position of members 60 to be uniformly adjusted to vary the "gear ratio". Opposite ends of members 60 are slidably mounted in circumferentially spaced radial slots 85, 86 in pulley side plates 87, 88 so as to enable direct surface to surface force transfer therebetween. FIGS. 4 and 5, illustrate another form of adjustment means comprising a pair of cone shaped annular plates 89, 90 slidably mounted on a shaft 91 with radially adjustable support members 92 connected thereto by inclined lugs 93 slidably mounted in inclined slots 94 on the plates 89, 90.

Figure 6:
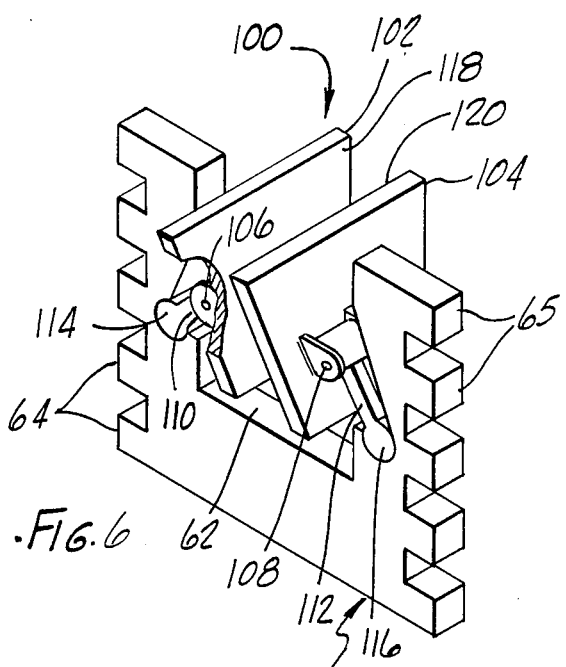
FIG. 6 is a schematic perspective view of one form of belt clamping apparatus which may be associated with the apparatus of FIGS. 2 and 3.
Figure 7:
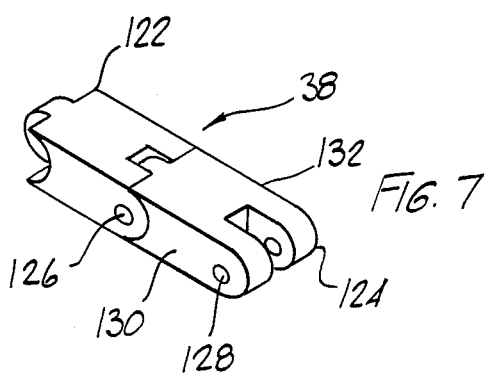
FIG. 7 is a schematic view of a portion of a drive chain which may be used with the apparatus of FIG. 6.
Figure 8:
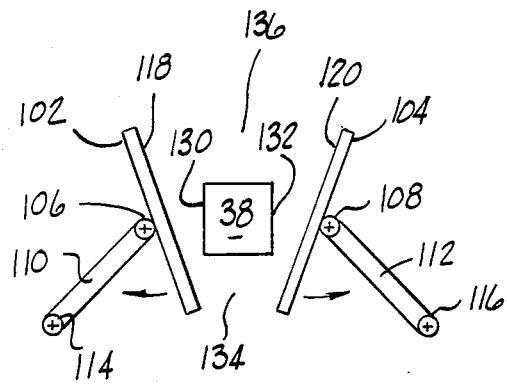
FIGS. 8 and 9 are schematic illustrations of the apparatus of FIGS. 6 and 7 in clamped and unclamped positions.
Figure 9:
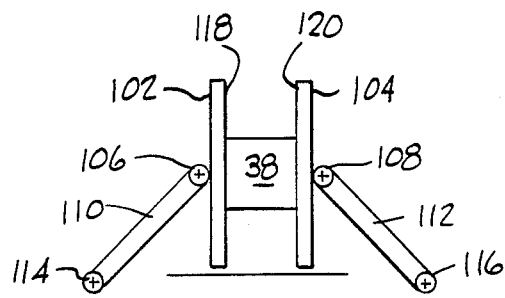

As shown in FIGS. 6 and 7, non-slip clamping means 100 are mounted on radially adjustable members 60 or 90 to grip the endless drive means 38. In the embodiment of FIG. 6, the clamping means 100 comprises a pair of oppositely facing clutch plate members 102, 104 which are connected by pivot means 106, 108 to pivot arms 110, 112 connected to member 60 by pivot means 114, 116. Plate members may be made of bronze alloy, leaded steel or hard steel with hard high friction inner surfaces 118, 120. As shown in FIG. 7, endless drive means 38 comprises a link chain made of metallic link members 122, 124 connected by pivot pin members 126, 128 and having flat side surfaces 130, 132 which are engagable with and grippable by plate members 102, 104 at any location therealong to enable the radial location of members 60 to be infinitely varied without concern for the area of gripping engagement along the chain. As schematically illustrated in FIGS. 8 and 9, the plates 102, 104 are normally located in upwardly outwardly inclined relationship to define a V shape trough 134 therebetween with an upper opening 136 substantially greater than the width of the chain to enable the chain to be initially freely moved into the trough at the pulley. After the chain has entered the trough 134 a substantial distance, it engages the side surfaces 118, 120 of plates 102, 104 to cause the plates to pivot about pivot means 106, 108 and be moved toward a parallel gripping position relative to the side surfaces of the chain as illustrated in FIG. 9. The radially inward movement of the chain 38 rotates pivot arms 110 and 112 inwardly, producing a sprag clutch effect between the endless drive means 38 and the "U" shaped support means 60. Thus the plates 102, 104 are brought into positive non-slip engagement with the chain 38 so that the pulley positively drives the chain or is driven by the chain during movement around the pulley. When the chain leaves the pulley, the plates release the chain and return to the open position due to centripetal force and/or spring force applying means (not shown) and change in chain tension.

Figure 10:
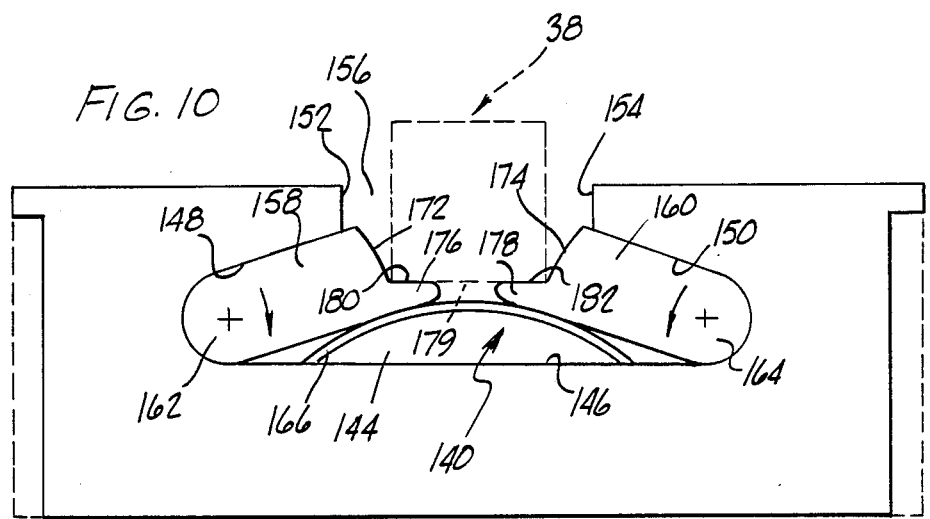
FIG. 10 is a schematic side elevational view of another form of clamping apparatus which may be associated with the apparatus of FIGS. 2 and 3.
Figure 11:
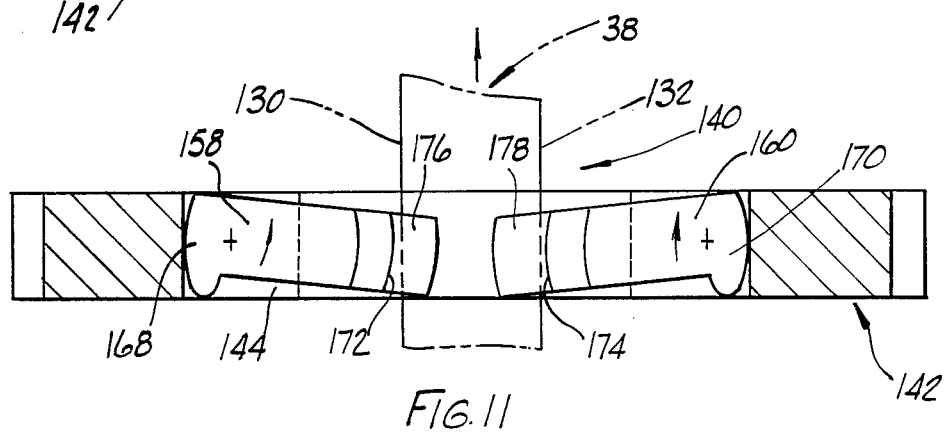
FIG. 11 is a schematic top view of the apparatus of FIG. 10.

FIGS. 10 and 11 illustrate another form of clamping means 140 mounted on another form of radially adjustable support members 142 adjustably mounted on the pulley means in the same manner as members 60. Members 142 have a generally T shaped slot 144 with a flat bottom surface 146, inclined upper surfaces 148, 150, and spaced flat side surfaces 152, 154 defining an opening 156 substantially greater than the width of chain member 38. Sprag type clamping members 158, 160 are pivotally mounted in opposite ends of slot 144 by pivot means 162, 164 for pivotal movement between a normally upwardly inclined position shown in FIG. 10 maintained by a spring means 166 and a downwardly pivoted position (not shown) substantially parallel with and abutting bottom surface 146. The outer ends of members 158, 160 are rounded to provide pivots 168, 170 to enable pivotal movement between an inclined open position illustrated in FIG. 11 and a closed parallel clamping position not shown. The inner ends of members 158, 160 have downwardly inwardly curved end surfaces 172, 174 which are also curved from side to side as illustrated in FIG. 11 and inward extending lower flange portions 176, 178 which provide upwardly facing surfaces 180, 182. In operation, the chain 38 is brought into engagement with clamping means 140 through opening 156. The chain side surfaces 130, 132 engage rounded side surfaces 172, 174 of clamping members 158, 160 to cause pivotal movement from the inclined position of FIG. 11 toward the aligned clamping position and the chain bottom surface 176 engages surfaces 180, 182 to cause pivotal movement of clamping members 158, 160 toward slot surface 146 against the bias of spring 166. Thus the chain is positively gripped by members 142 and driven by or drives the associated pulley as hereinbefore described. As the chain leaves the pulley, the members 142 are released relative to the chain by centripetal force, force at spring 166 and reduction in chain tension.

In another form of the invention illustratively shown in FIGS. 12 and 13, the pulleys 36, 40 carry radially adjustable "U"-shape members 60 as previously described, endless drive means 38 comprises a chain means which carries pulley clamping means, and clamp actuating means in the form of endless belts or chains 200, 202, 204 are operatively associated with the pulley clamping means as hereinafter described.

FIGS. 14-19 illustrate an endless chain type drive means 210 comprising a plurality of equally axially spaced clamping means 212, 213, each of which is mounted on a series of spaced parallel aligned link members 214, 215, 216, 217, etc. with adjacent ones of the clamping means being connected by a series of spaced parallel aligned link members 218, 219, 220, etc. through pivot pin means 222, 224. The clamping means 212 comprises a pair of oppositely facing clamping plate members 230, 232 mounted on clevis members 234, 236 for lateral inward and outward movement relative to the chain links between outwardly displaced pulley clamping positions of FIG. 16 and inwardly displaced non-clamping positions of FIGS. 14 and 19. Cam roller members 240, 242 are mounted on the inner end portions of the clevis members on guide track means provided by the upper surfaces 244 of link members 214–217, etc. and guide openings 245, 246 in outwardly extending flange portions 248, 250 of end link members 214, 215, 216 and 217. Clamping plates 230, 232 are biased toward the closed non-clamping position by spring means 252, 254 (FIG. 19) extending through aligned spring holes 256, 258 (FIG. 17) in the link members which are also provided with aligned pivot pin holes 260, 262. When the chain engages the support members 60 on the pulleys, the bottom surfaces 264 of the link members abut the support member bottom surface 62 and the outer side surfaces 266, 268 of clamping members 230, 232 are laterally movable into clamping engagement with the side surfaces 270, 272 of support member 60.

The clamp actuation means 200, 202 or 204 comprises an endless chain or belt type device as illustrated in FIGS. 15 and 16 made from link members 280, 282 pivotally connected by pin means 284 with a lug type cam means 286 extending outwardly therefrom with inclined side surfaces 288, 290 adapted to engage and displace the cam rollers 240, 242 as the clamp actuation means is brought into engagement therewith while traveling around pulleys 36, 40 as shown in FIGS. 13 and 14 and disengaged relative thereto as the drive means leaves the pulleys. The angle of the clamp actuation belt is controlled to cause engagement and disengagement of the clamping means at preselected positions.

Another form of an endless drive means 300 carrying a plurality of spaced clamping means 302 operable by an endless actuating means 304 is illustrated in FIG. 20. The endless drive means comprises a plurality of pivotally connected link members 306, 307, 308, 309, etc. which define a central lateral slot 310 in which the actuator means 302 is mounted. Actuator means 302 comprises a pair of oppositely spaced block members 312, 314 pivotally connected to link members 316, 318 by pivotal connecting means 320, 322. Link members 316, 318 are pivotally connected by pivotal connecting means 324 to enable upward outward movement of block members from an inner retracted non-clamping position as shown by solid lines in FIG. 20 to outer extending clamping positions 326, 328 shown by phantom lines in FIG. 20. In the retracted position, the inner side surfaces 330, 332 abut the side surfaces 334, 336 of the adjacent chain links and bottom surfaces 338, 340 are downwardly offset relative to the bottom surfaces 342 of the chain links. A spring means 344 biases the block members toward the retracted position whereat the bottom surfaces 338, 340 will first contact the bottom surface 62 of U-shaped support member 60, as the chain is brought into the associated pulley, to exert an upward force on the block members. In addition, the clamp actuation belt means 304 is brought into engagement with portions 346, 348 of link members 316, 318 above pivot means 324 to exert an inward force causing pivotal outward upward movement of block members toward side surfaces 270, 272 of support member 60 and to establish clamping engagement between surfaces 270, 272 and block surfaces 350, 352.

Figure 21:
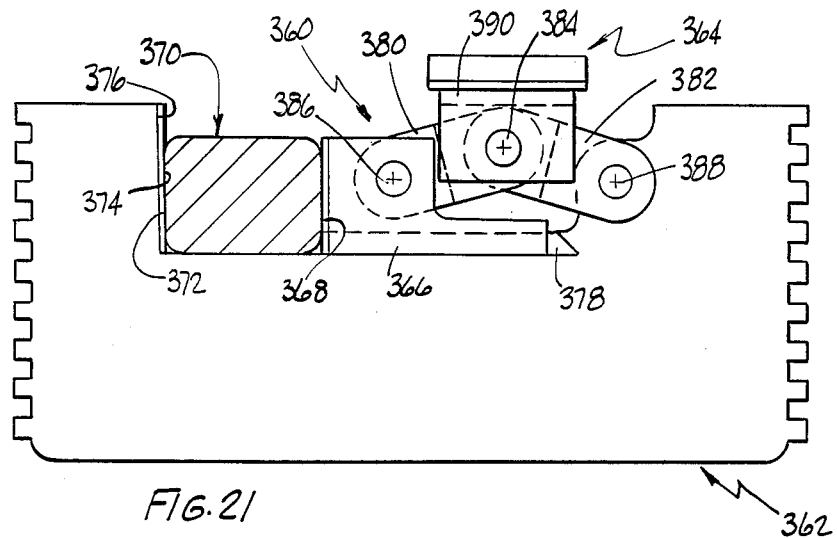
FIG. 21 is a schematic side elevational view of another embodiment of a clamping block and actuating mechanism.

In the embodiment of FIG. 21, the clamping means 360 is mounted on a U-shaped adjustable support means 362 and is operable by an endless actuating means 364 to move a clamping block 366 into clamping engagement with one side 368 of an endless chain type drive means 370 while the other chain side 372 is clampingly engaged with a high friction material 374 on the side wall 376 of the trough in U-shaped member 362. Block 366 is slidably mounted on dove-tail means 378 and actuated by link members 380, 382 pivotally connected to one another by pivot means 384 and to the block member and the U-shaped support member by pivotal connecting means 386, 388, respectively. The actuating belt means 364 is guided into engagement with a hat shaped member 390 mounted above the outermost portions of link members 380, 382 on pivotal connecting means 384 by suitable arrangement of the pulleys (not shown) supporting and driving belt means 365 as previously described.

Figure 23:
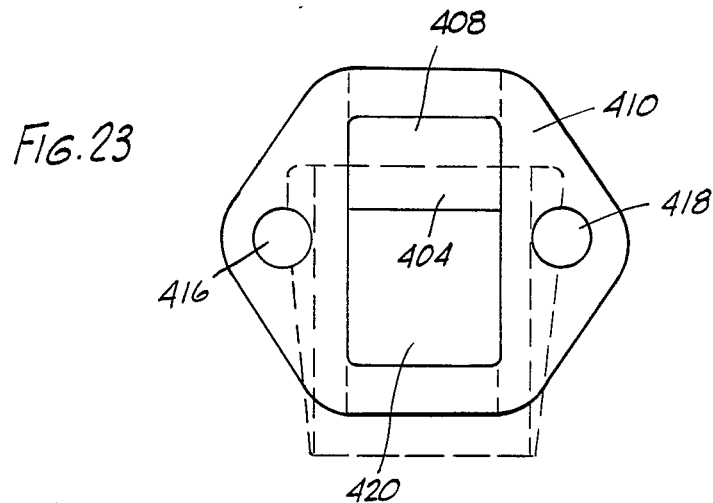
FIG. 23 is a schematic side view of a chain link of the apparatus of FIG. 22.
Figure 22:
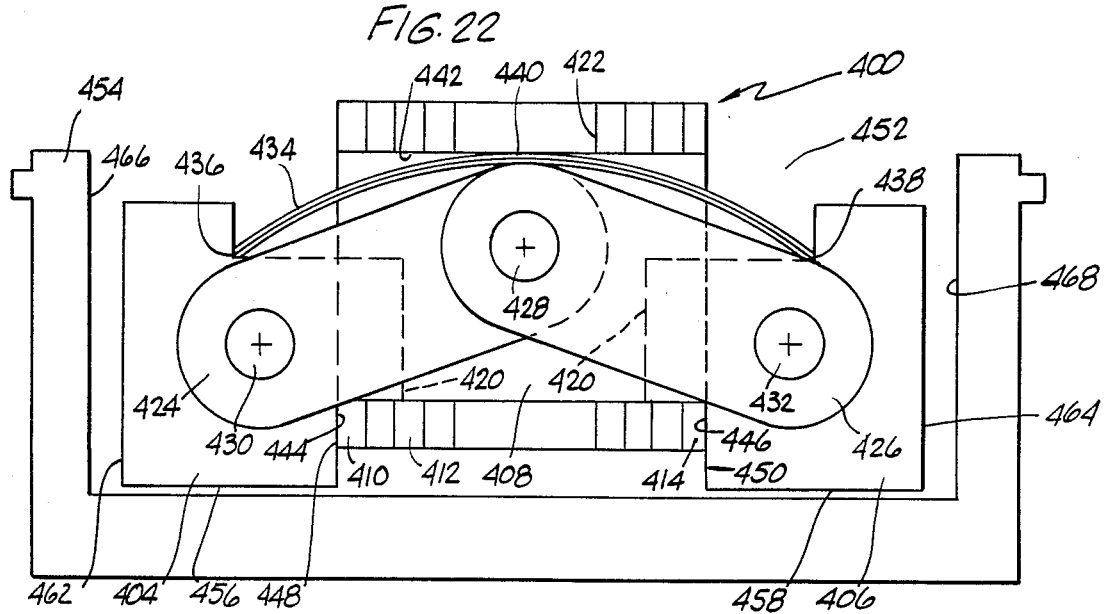
FIG. 22 is a schematic side elevational view of another embodiment of a clamping block and actuating mechanism.

FIGS. 22 and 23 illustrate a form of the invention wherein endless drive means 400 carry self-actuating clamping means 402 of the general type shown in FIG. 20. The clamping means 402 comprises a pair of clamping block members 404, 406 mounted in a laterally extending slot 408 in chain link members 410, 412, 414, etc. which are connected by pivotal connecting means 416, 418, FIG. 23. Inner portions 420, 422 of each of the blocks are guidably supported in slot 408 and link members 424, 426, connected by pivotal means 428, are connected to the blocks by pivotal connecting means 430, 432. A spring means 434 has end portions 436, 438 engaged with the blocks and a center portion 440 engaged with portions of the link members opposite pivotal connector means 428 and the inner surfaces 442 of the link members. Thus, spring means 434 biases the block members toward the retracted non-clamping position, shown by the solid lines in FIG. 22, whereat block side surfaces 444, 446 abuttingly engage link side surface 448, 450. When the driving chain means 400 enters the trough 452 in U-shaped adjusting member 454 and bottom block surfaces 456, 458 engage the trough bottom surface 460, the blocks are forced upwardly and outwardly against the spring forces applied thereto at 436, 438. The radial inward component of the tension force in drive chain 400 acts through inner surfaces 442 of link members 410–414 to further load link members 424, 426 and produce a force on pivotal connecting means 428 to move block side surfaces 462, 464 into clamping engagement with side surfaces 466, 468 of support member 454. As the driving means 400 leaves the drawing or driven pulley means, the block members are released and returned to the retracted non-clamping position by force applied by spring means 434.

Figure 24:
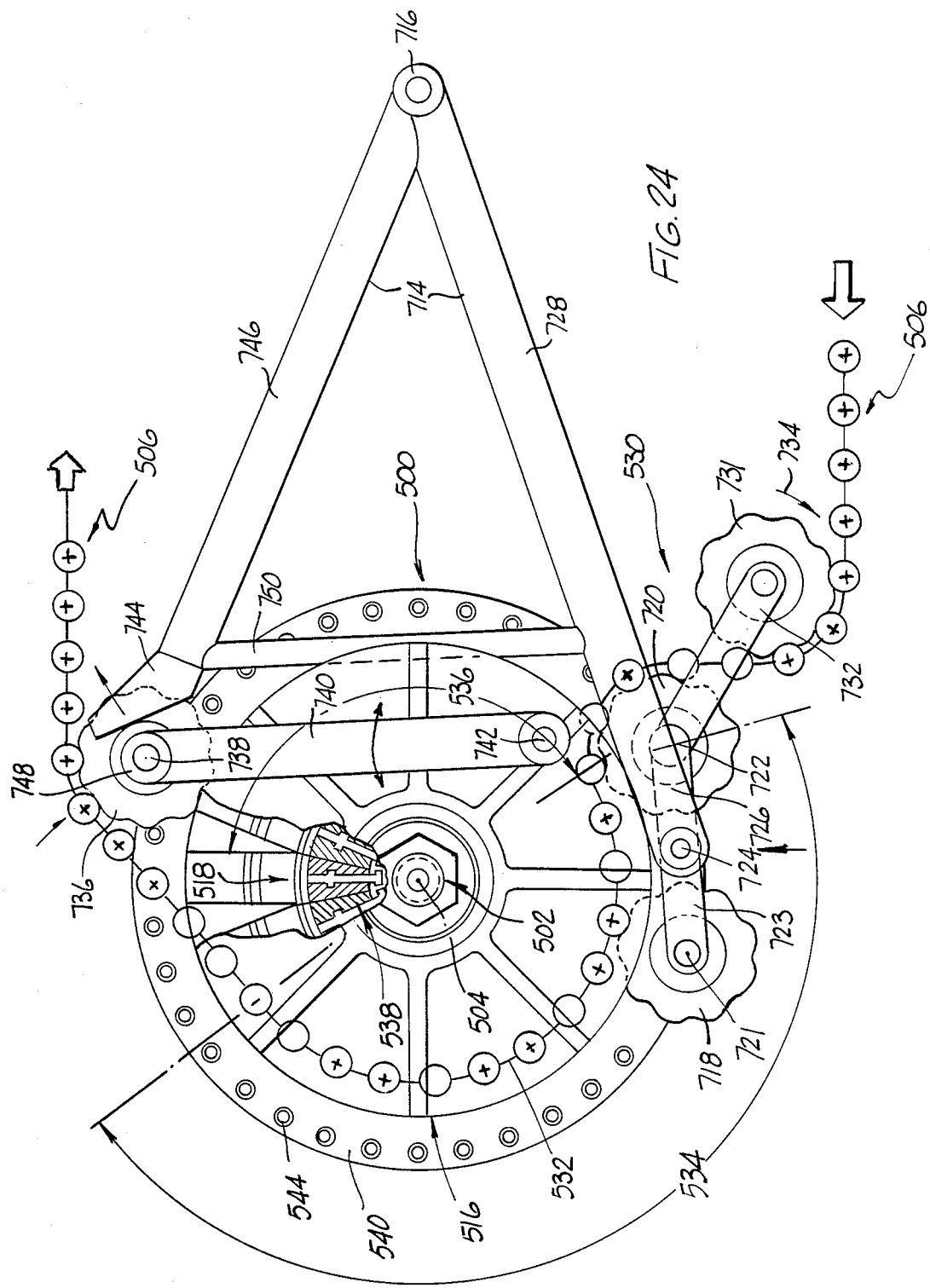
FIG. 24 is a side elevational view, with parts broken away, of another embodiment of the invention.
Figure 25:
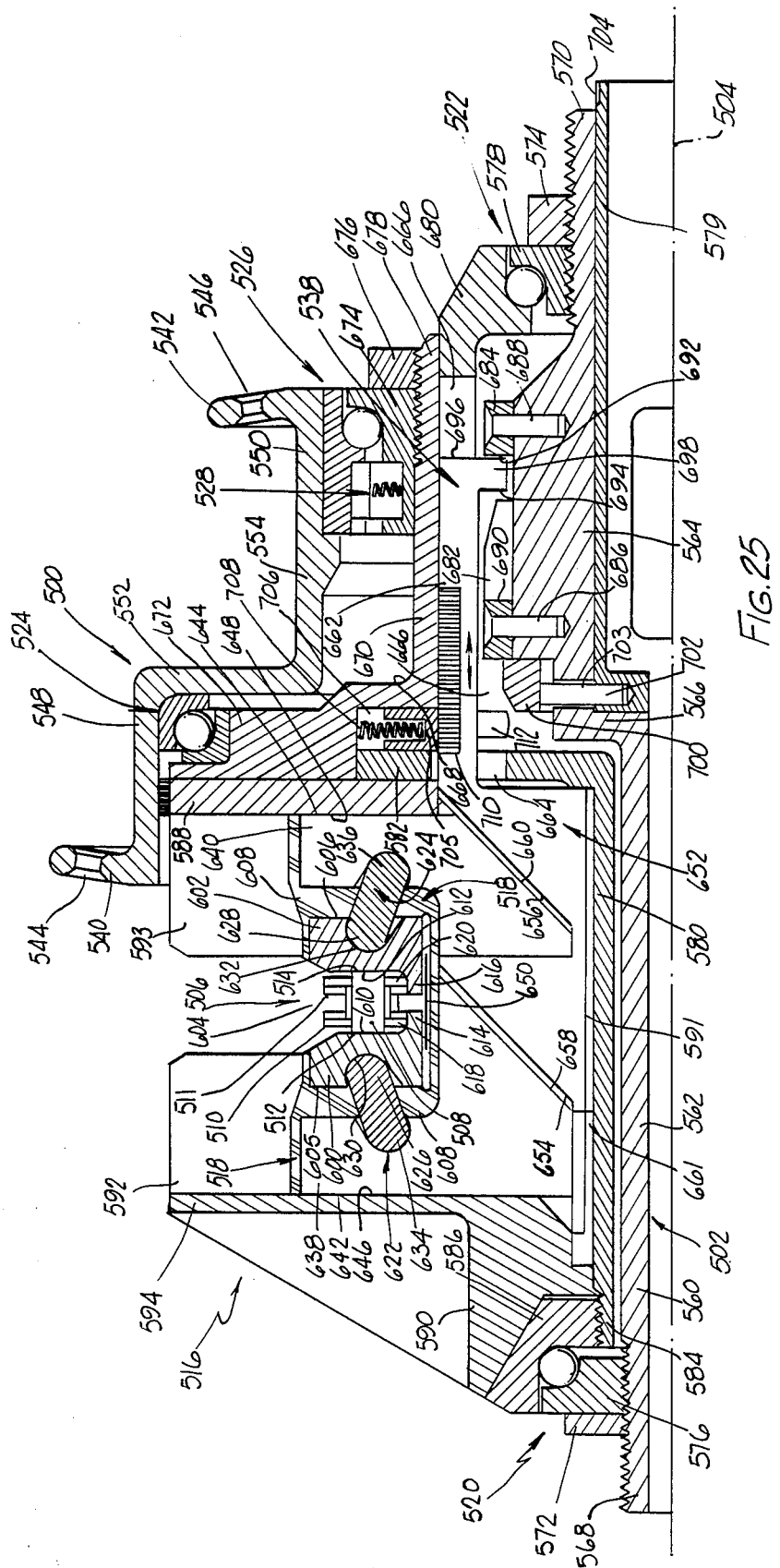
FIG. 25 is a cross-sectional view of the embodiment of FIG. 24.

FIGS. 24–25 illustrate a form of the invention adapted for use in a drive system of a bicycle or a motorcycle or the like having a wheel hub means 500 rotatably mounted relative to an axle means 502 for rotation about an axis of rotation 504 by drive chain means 506 comprising a plurality of pin members 508 connected by link members 510, 511 which are located between and spaced inwardly of pin end surfaces 512, 514. A pulley means 516 with chain clamping means 518 is rotatably mounted on axle means 502 by bearing means 520, 522. Wheel hub means 500 is rotatably mounted on pulley means 516 by bearing means 524, 526 and driveably connected thereto by one-way clutch means 528. A chain tension means 530 maintains a semi-circular rear curved portion 532 of the chain means 506 in proper relationship to the chain clamping means 518 so that each clamping means in a force transfer clamping zone 534 is clamped to a portion of the chain while also defining a free zone 536 wherein the clamping means are disengaged from the chain and may be variably radially displaced by adjustment means 538.

The wheel hub means 500 comprises annular spoke supporting flanges 540, 542 having spoke mounting holes 544, 546 for receiving spoke members (not shown) of a wheel rim (not shown). Central annular hub portions 548, 550 of varying diameter are connected by a radial flange portion 552. An annular abutment rib 554 extends radially inwardly from hub portion 550 to provide an abutment shoulder for bearing means 526.

Axle means 502 comprises an annular shaft member 560 having a small diameter portion 562 connected to a large diameter portion 564 by a radially extending portion 566. Opposite end portions 568, 570 of shaft member 560 are threaded to receive lock nuts 572, 574 and bearing race members 576, 578. A sleeve member 579 is mounted within shaft portion 564 for a purpose to be hereinafter described.

Pulley means 516 comprises an annular sleeve member 580 having a radially outwardly extending annular flange portion 582 at the axially inner end and a threaded outer end portion 584 which receives an annular bearing race member 586. An axially inner annular ring plate member 588 is fixedly mounted on inner flange portion 582. An axially outer annular flange member 590 is fixedly mounted on the outer end of sleeve member 580 in axially spaced opposed relationship to flange portion 582 and flange member 588 to define an annular cavity 591 therebetween. A plurality of equally circumferentially spaced guide bars 592, 593 are fixedly mounted on flange portion 594 and ring flange member 588 in opposite spaced relationship to define an annular chain gap 595 therebetween.

Chain clamping means 518 comprise a plurality of equally circumferential spaced pairs of clamping members 600, 602 mounted in opposite spaced relationship to define a chain gap 604 therebetween. Members 600, 602 are supported in pockets 605, 606 in an annular carrier means 608 made of a molded material such as rubber or plastic having sufficient flexibility and strength to enable movement of clamping members 600, 602 toward and away from one another between a chain clamping position (FIG. 25) whereat clamp side surfaces 610, 612 grip opposite pin end surfaces 512, 514 and a chain unclamping position (not shown). The clamp members have chain link abutment portions 614, 616 for engagement with radially innermost surfaces 618, 620 of chain link members 510, 511. Sprag clutch type elements 622, 624 have end portions 626, 628 pivotally mounted in recesses 630, 632 in clamp members 600, 602 with opposite end portions 634, 636 pivotally mounted in support plates 638, 640 having side surfaces 642, 644 slidably abutably engaged with side surfaces 646, 648 of flange members 594, 588. An annular spring member 650 is mounted beneath the clamp members to exert a radially outwardly directed force thereon to bias the clamp members toward the open unclamped position. Each set of support plates 638, 640 are mounted on an associated one of a plurality of axially movable circumferentially spaced wedge members 652 having inclined surfaces 654, 656 which engage inclined support plate surfaces 658, 660 whereby support plates 638, 640 may be shifted between various radially displaced positions to vary the effective diameter of the pulley means resulting in a ratio change of the drive system. Each wedge member is axially slidably supported on sleeve member 580 by suitable torque and groove means 661. An end portion 662 of each wedge member 652 extends through an opening 664 in flange portion 582 into an axially extending slot 666 between enlarged shaft portion 564 and an annular member 668 having a sleeve portion 670 and a radially extending flange portion 672 fixedly attached to flange members 582 and 588. A bearing race member 674 and a locking nut 676 are mounted on a threaded sleeve end portion 678 while a bearing race member 680 is mounted in the end of sleeve portion 670.

Adjustment means 538 comprises a pair of pivotally movable cam arm members 682, 684 mounted on enlarged shaft portion 564 in the free zone 536 by pivot pin members 686, 688. Oppositely facing cam surfaces 690, 692 on arm members 682, 684 are engageable with opposite side surfaces 694, 696 of a cam lug portion 698 of wedge members 652 during rotation through the free zone to cause axial displacement of the wedge members resulting in radial displacement of support plates 638, 640. An annular control ring member 700 is operatively connected to cam arm members 682, 684 by a pin and slot connecting means (not shown) and is rotatably mounted relative to enlarged shaft portion 564. Control ring member 700 is operatively connected to sleeve member 579 by pin mean 702 extending through slot means 703 in shaft portion 564. A gear device (not shown) is mounted on sleeve end portion 704 to selectively rotate sleeve member 579 relative to shaft member 560 to change the location of cam arm members 682, 684. Locking pin members 705 are mounted in cavities 706 containing compression spring members 708 which releasably bias the pin members 705 toward serrated slots 710 on wedge members 652 to effect locking engagement with the wedge members in the load zone 534 while being released by cam means 712 in the free zone 536.

Chain tensioning means 530 comprises a bracket 714 pivotally mounted on a pin 716 fixed to the frame of the vehicle. A pair of chain sprocket members 718, 720 are rotatably mounted by shaft members 721, 722 on opposite ends of a support bar member 723 pivotally mounted by a pin 724 in a clevis portion 726 of a lower bracket arm portion 728. Another lower chain sprocket member 730 is rotatably mounted by a shaft member 731 on the end of a support bar member 732 pivotally mounted on support bar member 723 by shaft member 722 and associated with a spring device (not shown) which biases support bar 732 in the direction of arrow 734 to maintain tension on the chain. An upper chain sprocket member 736 is rotatably mounted on a shaft 738 on the end of a pivot bar 740 mounted on a pivot shaft 742 fixed on the vehicle frame. An abutment shoe 744 mounted on an upper bracket support bar portion 746 engages a roller member 748 on sprocket shaft 738 to control pivotal displacement of pivot bar 740 in response to chain tension force applied to sprocket member 736. A cross brace member 750 is mounted between the upper and lower bracket support bar portions.

In operation, the chain first engages sprocket 731 and then extends upwardly over sprocket 720 and across sprocket 718. As the chain passes over sprocket 720, the chain is forced into the gap 595 toward the clamping means 518. As the chain moves toward sprocket 718, the chain is forced into engagement with the movable plates 600, 602 to effect large area surface to surface gripping engagement between pin surfaces 512, 514 and plate side surfaces 610, 612 by lateral and radial inward displacement of plates 600, 602 about the pivotal connection with sprag members 622, 624, which provide sprag clutch type locking means effective as long as chain force is applied thereto, against the radial outward bias of spring member 650. During movement around pulley means 516, the chain is held in clamped force applying relationship with the clamping means 518 by chain tension maintained by chain tensioning means 530. Force is transmitted from the chain to the wheel hub means 500 through clamp plates 600, 602, pulley means 516, sleeve member 668, and one way clutch means 528. As the chain moves from the pulley means 516 toward the sprocket member 736, the radial inward force applied by the chain to the clamping means is reduced and terminated as the chain leaves the pulley means whereupon the spring member 650 returns the clamping means 518 to the open unclamped position as the pulley means moves into the free zone. If a change in ratio is desired, sleeve 579 is rotated relative to shaft member 560 to cause pin member 702 to move a corresponding distance in slot 703 which actuates ring member 700 to change the positions of cam arm members 682, 684. As each wedge member 652 is carried into the free zone as the pulley means 516 rotates relative to shaft means 502, locking pin 705 is radially outwardly displaced by cam means 712 whereupon the wedge member is free to be moved axially if a change in position of cam arm members 682, 684 has been effected. As the wedge members are carried past the cam arm members, cam surfaces 690, 692 and 694, 696 are effective to axially position the wedge members in a desired location and each locking pin 705 is forced into locking engagement with each associated wedge member by compression spring 708 before the wedge members re-enter the force transfer zone 534. The circumferential width and spacing of clamp surfaces 610, 612 are determined by the pitch of the chain and are such as to assure that gripping engagement is effected with the chain pins as heretofore described.

Referring to FIG. 26, another embodiment of the invention is shown to comprise an annular shaft means 800 rotatably supported by suitable bearing means 802, 804; an annular drive gear means 806; a plurality of equally circumferentially spaced belt or chain clamping means 808 for gripping a belt or chain means 809; a ratio changing means 810; and a clamp actuating means 812.

Each clamping means 808 comprises a radially movable clamping bar member 820 having a belt clamping side surface 821 and a support arm portion 822 at the radially innermost end thereof with a belt supporting surface 823. A radially extending laterally movable clamping bar member 824 with a belt clamping surface 825 is mounted in axially oppositely spaced relationship to clamping bar member 820 to define a belt receiving gap 826 therebetween. Member 820 is adjustably slidably mounted in side plate members 827 by tongue and groove connecting means 828. An adjustment shaft 829 having spiral threads 830 is threadably engaged with spiral threads 831a on clamp member 820 so that rotation of rod member 829 causes radial inward and outward movement of clamp member 820 relative to side plate members 827. Shaft 829 is operated by a bevel gear 830a fixedly mounted on an enlarged end portion 831, a beveled ring gear 832, and a drive gear 833 suitably connected to a drive motor or the like. Torsion spring means 834, 836 are connected to bevel gear 830 and shaft 829 to provide an energy storage and lost motion connecting means therebetween whereby clamp members 820 are movable after they leave the force applying zone of gripping engagement with the belt 809 when spring means 834, 836 are effective to turn shaft 829 upon removal of the load applied by the belt to the clamp members in the force applying zone. Each clamping bar member 824 is operatively connected to a radially movable actuating bar member 840 by a plurality of sprag clutch type elements 841 having opposite end portions 842, 843 pivotally supported in pivot slots 844, 845. Bottom surface 846 of each clamping bar member 824 is supported on suitable bearing means 847 and side surface 848 of each actuator bar member 840 is supported o suitable bearing means 849.

Clamp actuating means 812 comprises a plurality of fluid operable piston members 850 slidably mounted in piston chamber 852 connected by a fluid passage 853 to a fluid chamber 854. Each piston member 850 is operably connected to the upper end portion of an associated one of the actuator bar members 840. A piston member 855 is reciprocably mounted in chamber 854 and is operably connected by a pin member 856 to a plate member 857.

In operation, clamp bar 824 is biased toward an open position by spring means 858 until belt means 809 enters gap 826 and engages surface 823 on belt supporting lug 822. Then a force is applied to plate 857 in the direction of arrow 859 by suitable force applying means such as a cam or belt device (not shown). Piston 855 is forced into chamber 854 which increases fluid pressure in piston chamber 852 to force piston 850 toward actuator bar 840. As actuator bar 840 is moved radially inwardly by piston 850, end portions 843 of sprag elements 841 are carried radially inwardly which causes end portions 842 to move radially outwardly and laterally displace clamping bar 824 toward belt 809. Thus, belt 809 is fixedly clamped by engagement of clamp bar surfaces 821, 825 with belt side surfaces 854, 853 within the force applying clamping zone. As the belt leaves the pulley means, the force applied on plate 857 is removed whereby forces exerted on clamping bar 824 cause reverse movement to the open unclamped position. The tension of the belt means is controlled as hereinbefore described. The pulley system of FIG. 26 may be used as both an input and output device. One such pulley system may be associated with an input shaft and another such pulley system may be associated with an output shaft. One or more stationary clamping and unclamping bands, with suitable tensioning devices, are mounted to engage the actuating plates 857 in the force applying zones. Plates 857 act against the stationary bands in the manner of a Kingsbury bearing.

While various alternative embodiments of the invention have been shown in the drawing and described hereinbefore, it is to be understood that other embodiments of the invention are intended to be included within the scope of the appended claims except insofar as limited by the prior art. For example, the general concepts may be utilized with a single channel single belt or chain pulley system or a multiple channel multiple belt or chain pulley system wherein multiple belts or chains are clamped in the force applying zone by a single control device. In addition, it is to be understood that the invention is applicable in many fields of use by force applied from an endless actuating device associated with the rotatable pulley-type device during a portion of each revolution thereof.

What is claimed is:

1. A system for transmitting driving force from a power source to a driven device comprising:
    at least one wheel-type rotatable drive means operably associated with said power source for transmitting power from said power source to said driven device;
    at least one rotatable wheel-type driven means operably associated with said rotatable drive means and said driven device for transferring power from said rotatable drive means to said driven device;
    endless loop-type power transmitting means operatively associated with said rotatable drive means and said rotatable driven means for transmitting power therebetween;
    said endless loop power transmitting means having longitudinally extending oppositely laterally facing flat rigid side surface abutment means of substantial area for transmitting power between said endless loop power transmitting means and said drive means and said driven means;

radially inwardly and outwardly movable continuously variable diameter changing means associated with at least one of said rotatable drive means and said rotatable driven means for rotation therewith and in rigid force transfer relationship therewith and being radially inwardly and outwardly adjustable relative thereto for changing the power transmission ratio of said system by effecting force transmitting flat surface area contact with said endless loop-type power transmitting means at variable radially spaced locations; and a plurality of separately operable circumferentially spaced clamping means associated with one of said endless loop power transmitting means and said diameter changing means for movement therewith to variable radially displaced locations and each of said clamping means having laterally facing flat rigid side surfaces of substantial area for clamping engagement by non-linear non-point contact with opposed circumferentially spaced laterally facing flat rigid side surface portions of substantial area on the other one of said endless loop-type power transmitting means and said diameter changing means, and holding said endless loop power transmitting means in fixed relationship to said diameter changing means in all radially displaced locations thereof by lateral movement of said clamping means between an open non-clamping non-force transfer position and a closed clamping force transfer position whereat the entire surface area of said oppositely laterally facing flat rigid side surface portions are held in fixed abutting non-linear non-point contacting relationship with the entire surface area of said laterally facing flat rigid side surfaces of said clamping means; and said oppositely laterally facing flat rigid side surface portions and said laterally facing flat rigid side surfaces of said clamping means being constructed of essentially incompressible non-stretchable rigid materials and arranged to be engaged and disengaged essentially only by and during transverse non-radial lateral movement without sliding frictional radial movement therebetween and providing only flat abutment surface non-linear non-point contact areas of sufficient width and length to provide essentially simultaneous non-slidable positive non-slip area contact clamping engagement between said flat abutment surface contact areas during normal operating conditions.

2. The invention as defined in claim 1 further comprising:

releasable locking means operably associated with said clamping means for locking said endless loop-type power transmitting means relative to said diameter changing means in all radially displaced locations thereof.

3. The invention as defined in claim 1 and further comprising:

said clamping means being mounted on said diameter changing means; and abutment means associated with each of said clamping means for engaging circumferentially spaced portions of said endless loop-type power transmitting means and actuating said clamping means from the open non-clamping position to the closed clamping position upon contact with said endless loop-type power transmitting means.

4. The invention as defined in claims 1 or 2 and wherein said diameter changing means comprising:

a plurality of circumferentially spaced U-shaped yoke members having a bottom surface and spaced radially outwardly extending side surfaces defining a gap therebetween for receiving said endless loop-type power transmitting means.

5. The invention as defined in claim 4 and wherein said clamping means comprising:

a pair of pivotally displaceable clamp devices mounted on opposite sides of said yoke member for receiving said endless loop-type power transmitting means therebetween and having opposed side surfaces for clamping engagement with opposite side surfaces of said endless loop-type power transmitting means.

6. The invention as defined in claim 4 and wherein said clamping means comprising:

at least one movable clamping block means for movement into and out of clamping engagement with at least one of said side surfaces of each of said U-shaped yoke members.

7. The invention as defined in claim 6 and wherein said clamping block means comprising:

a pair of oppositely facing side surfaces engageable with both of the side surfaces of said yoke member.

8. The invention as defined in claim 7 and wherein:

said clamping block means being mounted on and carried by said endless loop-type power transmitting means.

9. The invention as defined in claim 6 and wherein said clamping block means being mounted on and carried by said diameter changing means.

10. The invention as defined in claim 1 or 2 and wherein:

said clamping means being mounted on said endless loop-type power transmitting means for clamping engagement with said diameter changing means during movement of said endless loop-type power transmitting means therearound.

11. The invention as defined in claim 6 and further comprising:

at least one endless loop-type clamp actuating means mounted in juxtaposition to said clamping means and said diameter changing means for actuating said clamping means during movement of said endless loop-type power transmitting means around said diameter changing means.

12. The invention as defined in claim 1 wherein said endless loop-power transmitting means comprising a link-belt member having a plurality of separately pivotally connected link members and each link member being made of rigid non-compressible material and providing said rigid flat side surface abutment means.

13. A positive non-slip surface area-type contact force transmission system for transmitting force from a power source such as an internal combustion engine or the like to a driven apparatus such as a rotatable shaft connected to a vehicle wheel or the like comprising:

continuously operable rotatable force output means for connecting and continuously transferring driving force from the power source to the driven apparatus;

force transfer means for connecting the power source to the rotatable force output means including a first rotatable force transfer drive pulley means for receiving driving force from the power source, a second rotatable driven force transfer pulley means for transferring force to said rotatable force output means, and an endless loop force transfer means for transmitting force from said drive pulley means to said driven pulley means;

selectively operable speed change means associated with one of said force transfer pulley means for infinitely increasing and decreasing the rotational speed of said rotatable force output means within a preselected range of rotational speeds;

first flat surface force transfer abutment means on said one of said force transfer pulley means and second flat surface force transfer abutment means on said endless loop force transfer means for establishing rigid non-slip abutting force transfer engagement with one another during the time of force transfer therebetween without establishment of radially directed components of force causing loss of efficiency due to frictional losses resulting from slippage therebetween during engagement and disengagement each of said first flat surface abutment means and said second flat surface abutment means having relatively large area flat abutment surfaces which are engageable with one another by non-linear non-point full surface contact thereof; and a plurality of spaced separately intermittently automatically operable clutch-type clamping means for continuously connecting said endless loop force transfer means to said one of said pulley means at all rotational speeds during circumferential movement therearound by causing non-selective automatic positive locking engagement between first flat surface force transfer abutment means and said second flat surface force transfer abutment means by area contact therebetween along any portions of said endless loop force transfer means located in circumjacent juxtaposition to said one of said pulley means and for causing continuous uninterrupted positive transfer of force and rotational movement of said rotatable force output means; and said first flat surface force transfer abutment means and said second flat surface force transfer abutment means providing only abutting flat force transfer surfaces and being constructed of essentially incompressible non-stretchable rigid materials and arranged to be engaged and disengaged essentially only by and during transverse non-radial lateral movement without sliding frictional radial movement between said abutting flat force transfer surfaces, and said abutting flat force transfer surfaces providing only flat abutment surface contact areas of sufficient width and length to provide essentially simultaneous non-slidable positive non-slip area contact clamping engagement between said abutting flat abutment surface contact areas during normal operating conditions.

14. The system as defined in claim 13 and wherein the power source is directly connected to said force transfer means.

15. The system as defined in claim 14 and wherein the power source is an internal combustion engine having piston rods of the engine cylinders directly connected to said force transfer means.

16. The invention as defined in claim 13 and wherein said endless loop-power transmitting means comprising a link-belt member having a plurality of separately pivotally connected link members and each link member being made of rigid non-compressible material and providing said rigid flat side surface abutment means.

17. A positive non-slip area contact force transmission system for transmitting force from a power source such as an internal combustion engine or the like to a driven apparatus such as a rotatable shaft connected to a vehicle wheel or the like comprising:

continuously operable rotatable output force means for connecting and continuously transferring driving force from the power source to the driven apparatus;

force transfer means for directly connecting the power source to the rotatable output force means;

selectively operable speed change means associated with said force transfer means for infinitely increasing and decreasing the rotational speed of said rotatable output means within a preselected range of rotational speeds;

first flat surface abutment means on said rotatable force output means and second flat surface abutment means on said force transfer means for establishing rigid non-slip abutting force transfer engagement with one another during the time of force transfer therebetween without establishment of radially directed components of force causing loss of efficiency due to frictional losses resulting from slippage therebetween during engagement and disengagement each of said first flat surface abutment means and said second flat surface abutment means having relatively large area flat abutment surfaces which are abuttingly engageable with one another by non-linear non-point type contact over substantially the entire surface area; and intermittently automatically operable clutch means for automatically continuously connecting the force transfer means to the rotatable output force means at all rotational speeds by non-selective automatic positive locking engagement of said clutch means with any portion of said rotatable output force means located in juxtaposition to said clutch means and for causing continuous uninterrupted positive transfer of force and rotational movement of said rotatable output force means.

18. The system as defined in claim 17 and wherein the power source is directly connected to said force transfer means.

19. The system as defined in claim 18 and wherein the power source is an internal combustion engine connected to said force transfer means.

20. The invention as defined in claim 17 wherein said endless loop-power transmitting means comprising a link-belt member having a plurality of separately pivotally connected link members and each link member being made of rigid non-compressible material and providing said rigid flat side surface abutment means.

* * * * *